Sept. 16, 1969  KAZUO ASANO  3,466,706
CLAMPING DEVICE
Filed Nov. 8, 1966  2 Sheets-Sheet 1
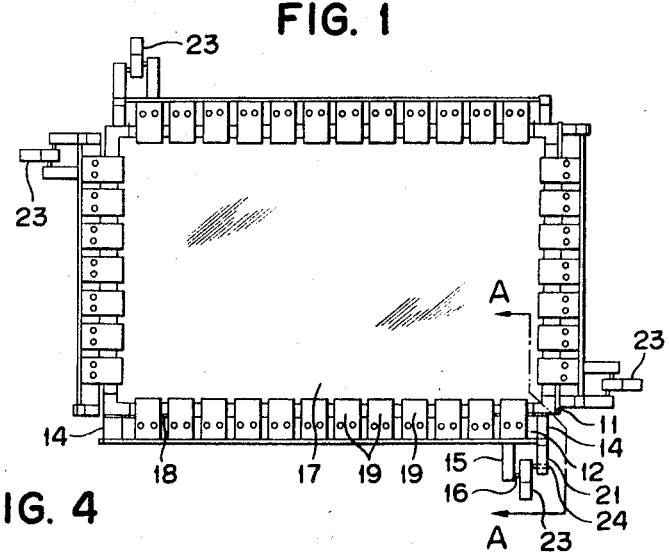
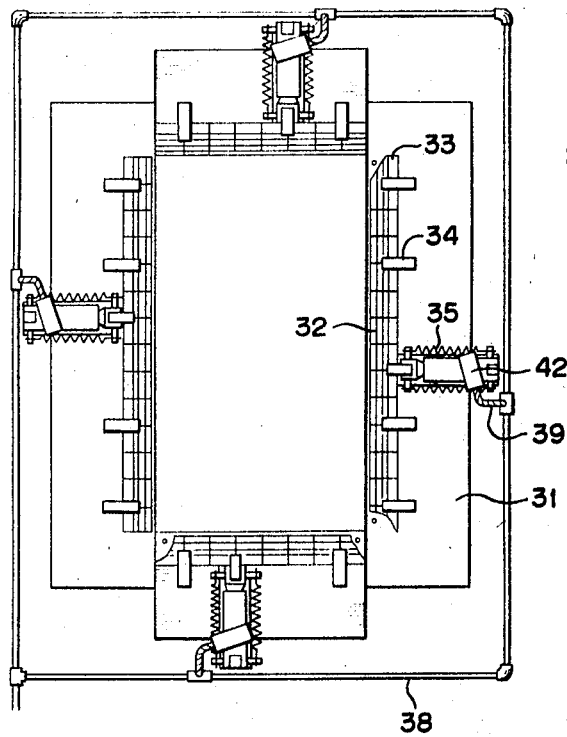
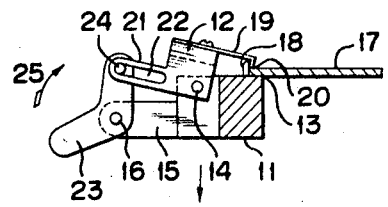
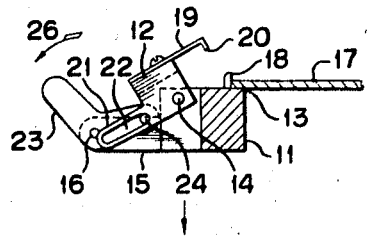

Sept. 16, 1969 KAZUO ASANO 3,466,706
CLAMPING DEVICE

Filed Nov. 8, 1966 2 Sheets-Sheet 2

United States Patent Office 3,466,706
Patented Sept. 16, 1969

3,466,706
CLAMPING DEVICE
Kazuo Asano, 9 Aza-Miyukiyama, Oaza-Yagota, Tempaku-chyo, Showa-ku, Nagoya, Japan
Filed Nov. 8, 1966, Ser. No. 592,924
Int. Cl. B29c 17/02; D06c 3/00
U.S. Cl. 18—19                                    9 Claims

ABSTRACT OF THE DISCLOSURE

A clamping device for securing thermoplastic sheet material in an apparatus for forming articles from such material is formed of a picture frame shaped base member containing a clamping member along each of its sides. Each clamping member contains a plurality of separate resilient clamping elements arranged to be pivotally moved as a unit between a clamped position and a released position. Actuating means are secured to the base member for moving the clamping members between the clamped and released positions.

---

This invention relates to a clamping device for sheet material and more particularly to such a device as to be used in an apparatus for forming articles from thermoplastic sheet material.

In the art of forming articles such containers or the like from thermoplastic sheet material, various types of apparatuses have been used, among which there are a vacuum molding apparatus, a pressure molding apparatus and a vacuum-pressure apparatus wherein there is caused a differential pressure between one side of the plastic sheet and the other side thereof so that the softened plastic sheet may be closely fitted on the mold. In these apparatuses the sheet material is to be naturally held firmly by means of any clamping or gripping device.

The conventional clamping device for that purpose consists of a set of plain frames between which the thermoplastic sheet to be molded is inserted and positioned. However, this type of the clamping device has many disadvantages, for example, the engagement between the clamping device and the sheet material being incomplete due to the nonuniform thickness of the sheet material which will cause various important troubles and obstacles, or considerably high mechanical force being required since the surfaces of the upper and lower clamping frames have to be truly parallel with each other. Another disadvantage caused by the known clamping device is the difficulty of insertion of the sheet material between the frames.

A fundamental object of this invention is, thus, to provide an improved clamping device which can eliminate the disadvantages hereinbefore described.

According to this invention, the clamping device comprises a plurality of clamping elements at the periphery thereof, whereby the sheet material to be molded is firmly held. The clamping elements are engaged with the sheet material at a very small area or with line-contact. Each clamping element gives a clamping force to the periphery of sheet material in the engagement, so that the sheet material may be resiliently held between each individual clamping element and a fixed member cooperating therewith.

Another object of this invention is to provide an improved clamping device which is completely opened in the sheet releasing position whereby automatic sheet feeding, which has been difficult with the known devices, is made possible or the manual feeding is made easier.

Figure 5:
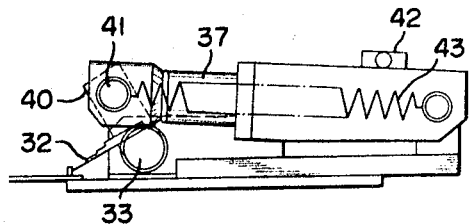
Figure 6:
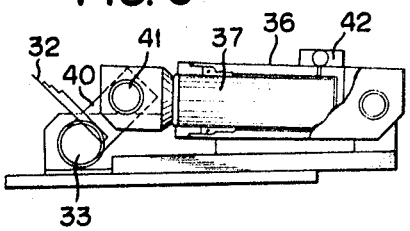
Figure 7:
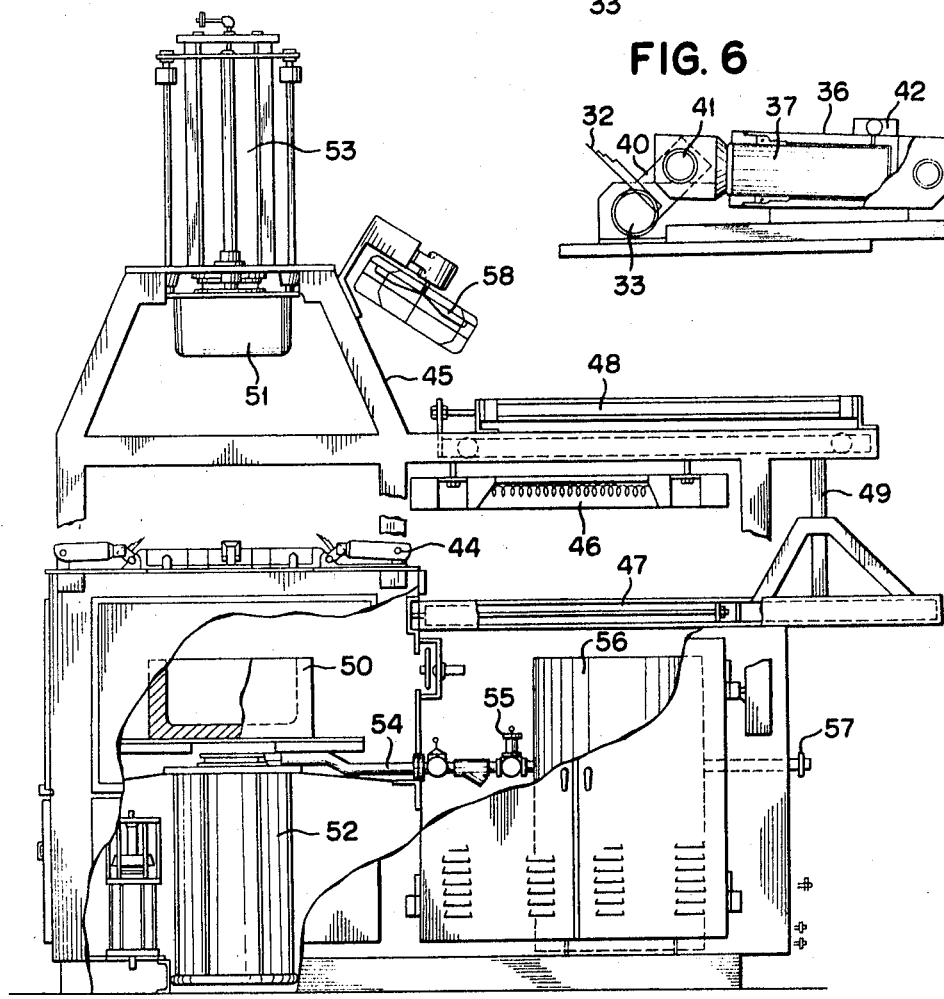

The other objects and features of this invention will be understood from the following description to be made in reference to the accompanying drawings, wherein:

FIG. 1 is a plan view of one embodiment of this invention,

FIG. 2 is a sectional view of FIG. 1 taken along line A—A and showing one of the clamping elements in the engaging position, FIG. 3 is a view similar to FIG. 2, but the clamping element is in the open or releasing position, FIG. 4 is a plan view of another embodiment of this invention, FIG. 5 is a sectional view of FIG. 4 taken along line B—B and showing another type of the clamping element in detail, FIG. 6 is a similar view but the clamping element is in the open position, FIG. 7 is a side elevational view of the apparatus for forming articles from the sheet material using the clamping device as illustrated in FIG. 4.

Referring to FIGS. 1 to 3 in the accompanying drawings a fixed supporting member is designated by numeral 11. A plurality of clamping elements 19 each of which is preferably in the form of a leaf spring are fixed on a movable holding member 12, which is pivoted to the supporting member 11 by means of pin 14 so that the free ends of the clamping elements may be angularly moved toward and away from the fixed supporting member 11. An actuating arm 21 having an elongated slot or aperture 22 extends from outer end of the holding member 12. On a supporting arm 15 projecting outwardly from the fixed supporting member 11, an operating lever 23 is pivoted by means of a pin 16. Fixed to one end of the lever 23 is a pin 24 which engages with the slot 22 formed in the actuating arm 21 holding member 12. A plurality of pins 18 are preferably planted along the fixed supporting member 11 for positioning the sheet material. It will be seen from FIGS. 1 to 3 that along every side of a plastic sheet material 17 to be molded to form articles there are provided four similar assemblies, each of which comprises said extended fixed supporting member 11, a plurality of movable holding members 12 respectively pivoted to the fixed supporting member 11 by means of the extended pin or bar 14. Secured on each of the movable holding members 12 are the leaf spring members 19 and the lever 23 linking one of the movable holding members 12 with the fixed supporting member 11 so that rocking movement of the lever as shown by an arrow 25 in FIG. 2 by an arrow 26 in FIG. 3 may actuate all of the clamping elements 19 simultaneously and in unison to their open or engaging positions.

The operation of the device according to the present invention is as follows: The predetermined dimension of plastic sheet 17 is positioned on the clamping device so that each edge of said sheet is correctly supported on the inner edge of the corresponding fixed supporting member 11 with aid of the guide pins 18 planted thereon (FIG. 3). Since the clamping members, each comprised of the holding member 12 and a number of clamping elements 19 are, in this position, sufficiently opened, it is quite easy to position the sheet material. When the lever 23 is driven by any suitable means (not shown) to swing counter-clockwise (arrow 26) in FIG. 3 about the pin 16, the pin 24 slides in the slot 22 formed in the movable holding member 12 which will be rotated to take the position as shown in FIG. 2. Therefore, the sheet material 17 is secured between a clamping portion 13 of the fixed supporting member 11 and the free ends of the clamping elements 19. At the free end of each of the clamping elements 19, there is preferably formed a clamping portion 20, for instance by bending the free end. Supposing a triangle of which base is formed by a line connecting the pins 14 and 16, and of which apex is the center of the pin 24, when the dimension of each member is determined in such way that the vertical angle of said triangle is less than 90° in the position of FIG. 2, the sheet material may be still held between the clamping portions 13 and 20 under the existence of spring force of the clamping element 19, even if the force to press down the arm 23 is removed. When the lever 23 is pushed up in the direction indicated by the arrow 25, the clamping elements return to the initial position as shown in FIG. 3, and thus the clamped sheet material 17 is released from the engagement.

In the device shown in FIG. 1, the movable holding member 12 may be held in its position shown in FIG. 3 by its own weight. If the member 12 cannot maintain said position, however, a suitable means, such as a spring may be used for normally keeping the position.

Referring to FIGS. 4–7, the second embodiment of this invention shall be explained in connection with the apparatus for forming articles from the plastic material. Such apparatus for forming articles from plastic material is, however, outside of the invention.

Above a fixed base member or clamping base 31, a plurality of clamping members 32 are mounted, which consist of laminated leaf springs. These clamping members 32 are fixed to a connecting rod 33 by suitable means such as welding or the like, and thus all clamping members are rocked all together with angular movement of the rod which is journaled by guide means 34. The rod 33 is actuated by any suitable means, such as an actuator 35 which consists of a cylinder 36 and a piston rod 37 and is operated by a fluid pressure. There will be no need for describing the construction thereof in detail herein.

The pressure fluid for the actuator 35 is supplied through a duct 38 and a flexible pipe 39 from the source not shown. The piston rod 37 is connected to a lever 40 by a pin 41, the lever being connected to the connecting rod 33.

On the actuator 35, is mounted valve assembly 42 applying a suitable pressure fluid to the cylinder 36 through both the piping 38 and the flexible pipe 39 so as to actuate the piston 37. A spring 43 is provided to serve for returning the piston 37.

Thus, when the fluid pressure is applied to the actuator 35, the piston 37 protrudes from the cylinder 36 to rotate the lever 40 clockwise in FIGS. 5 and 6, thereby the clamping elements rotate with the rod 33 and are pressed against the sheet material being positioned on the clamping base 31.

The operation may be effected in such a manner as described hereinafter.

In FIG. 7 the clamping device as shown in FIG. 4 and generally designated with a reference numeral 44 is mounted on a frame 45 of the apparatus. Upper and lower heaters 46 and 47 are also provided on the frame 45, these heaters being electrically energized and serving for softening the thermoplastic sheet material. A connecting member 49 connects the upper and lower heaters so as to move as a unit. The heating unit is driven by a suitable means 48 to move to left in FIG. 7 so as to heat the sheet material clamped by the device 44.

Under the clamping device 44, a mold 50 is mounted on an air cylinder 52 which serves for moving the mold 50 vertically. Above the clamping device 44, a punch or plug 51 is mounted on an air cylinder 53 having the same function with that of the air cylinder 52. A pipe 54 is connected to the mold 50 and to a surge tank 56 through a valve 55. The surge tank 56 is connected to a vacuum pump (not shown) through a pipe 57.

In the state shown in FIG. 7, the upper and lower heater 46 and 47 are electrically heated, and the sheet material is positioned and clamped on the clamping device 44. The unit formed by heaters 46–47 moves toward the clamping means 44 under the pressure applied to the device 48. The heating unit heats the sheet material on both sides thereof to a proper temperature for molding articles therefrom. After heating the sheet material, the heating unit returns to the initial position. The mold 50 is then moved upwardly by means of the air cylinder 52 to abut with the sheet material. Simultaneously or little later than this movement of the mold 50, the plug or punch 51 is moved downwardly by means of the air cylinder 53 so that the sheet material is held between the mold 50 and the plug 51. After this rough or preliminary forming operation, the valve 55 is opened so as to accomplish the final or finishing forming operation by means of the vacuum process. The air in the mold 50 is sucked from a number of small perforations formed over the mold 50 by means of the surge tank 56 through the pipe 54. The sheet material is thus pressed into the inner wall of the mold 50 under the surrounding atmospheric pressure, and thereby takes the precise finished shape. Then the plug 51 returns its original position as shown in FIG. 7. Simultaneously to this movement of the plug, a cooling fan 58 mounted on the frame 45 is rotated for cooling the formed article. After cooling, the formed article is removed from the clamping device 44.

Since the clamping device of this invention is arranged so as hereinbefore described, in case where the clamping device is in the open position, the space over the clamping device is fully opened so as to permit the sheet feeding directly from overhead thereof, whereby it is made possible to apply same to a continuous article forming machine. Furthermore, various troubles are eliminated completely such as that an insufficient clamping of the sheet material may cause failure of the desired formation of articles, jamming of the sheet material in the apparatus and the like, owing to firm gripping of this device.

The piano-key-touch contact according to this invention provides a very small contact area between the clamping elements and the sheet material, while the conventional clamping device needed relatively large contact or clamping area. The clamping area needed in this invention is only about 5 mm. in its width, while the conventional device needed 15–20 mm. width clamping space. This small contact area gives various economical advantages. The cost of the thermoplastic sheet material is markedly decreased.

This invention has been hereinbefore described referring to some embodiments shown in the accompanying drawings. However, it will be noted that various modifications and variations of shape, construction and arrangement of parts as referred to above are easily made by those skilled in the art, without departing from the spirit or scope of the present invention.

What I claim is:

1. A clamping device to be used in apparatus for forming articles from thermoplastic sheet material comprises a multisided picture frame-shaped base member adapted to support about its inner periphery the edges of the thermoplastic sheet material, support means secured to said base member, actuating means operatively connected to said support means and to said base member, a longitudinally extending holding member disposed along each side of said base member and attached to said actuating means, a plurality of separate spaced resilient clamping elements disposed along and secured to each said holding member and being movable therewith between a clamped position and a released position by manipulating said actuating means, whereby in the clamped position said clamping elements are arranged to secure the thermoplastic sheet material on said base member at a number of spaced positions along each side thereof, and when displaced to their released position by said actuating means said clamping elements are disposed outwardly from the clamped position and the thermoplastic sheet material can be placed downwardly on said base member without any obstruction in its path.

2. A clamping device as set forth in claim 1, wherein guide elements are secured to said base member at spaced locations along and adjacent the inner periphery of each of its sides for providing guides for the edges of the thermoplastic sheet material adapted to be supported by said base member.

3. A clamping device as set forth in claim 1, wherein said support means comprises a pin shaped member secured to and extending outwardly from the opposite ends of each side of said base member.

4. A clamping device as set forth in claim 3, wherein a supporting arm is secured to the outer surface of each side of said base member and extends outwardly therefrom, said actuating means comprising an actuating arm pivotally mounting on said pin-shaped member and extending laterally outwardly from said base member, and an actuating lever pivotally connected to said supporting arm and operatively connected to said actuating arm, and said holding member attached to said actuating arm for movement therewith for locating said clamping elements in the clamped and released positions.

5. A clamping device as set forth in claim 4, wherein said clamping elements comprise an elongated leaf spring member secured at one end to said holding member and with its other end located relative to said frame-shaped base member laterally inwardly therefrom, the other end of said spring member bent angularly toward said base member for providing a linear contact surface at the other end thereof adapted to contact the thermoplastic sheet material supported along the inner edge of said base member.

6. A clamping device as set forth in claim 4, wherein said actuating lever has a bell-crank shape and has a pin at one end thereof, said actuating arm having a slot formed therein in the portion thereof extending outwardly from said base member, said pin on said actuating lever fitted into the slot in said actuating arm for movement therethrough, said actuating lever pivotally secured at its midpoint to said supporting arm, whereby in pivoting said actuating lever about its connection to said supporting arm said pin thereon moves through the slot in said actuating arm displacing said actuating arm and pivotally moving said holding member and clamping elements secured thereto between their clamped position and their released position.

7. A clamping device as set forth in claim 1, wherein said support means guide means positioned along said base member, said holding member comprising a connecting rod extending along each side of said base member, said clamping elements secured to said connecting rod, and said actuating member comprises a piston rod and cylinder arrangement operably connected to said connecting rod for pivoting said connecting rod and said clamping elements mounted thereon between its clamped position and its released position.

8. A clamping device as set forth in claim 7, wherein said clamping elements comprise a plurality of laminated leaf springs attached to said connecting rod and pivotally movable therewith.

9. A clamping device as set forth in claim 7, wherein said piston rod and cylinder is positioned intermediate the ends of the sides of said base member, and a lever is attached to said piston rod and when said piston rod is displaced outwardly from said cylinder said lever rotates said connecting rod and displaces said clamping elements from the released position into the clamped position.

References Cited
UNITED STATES PATENTS

| | | |
|---|---|---|
| 2,700,179 | 1/1955 | Benson. |
| 2,759,217 | 8/1956 | Peterson. |
| 3,193,881 | 7/1965 | Kostur _____ 26—62 XR |
| 3,287,765 | 11/1966 | Puente _____ 18—19 |
| 3,315,301 | 4/1967 | Dibblee et al. |
| 3,025,566 | 3/1962 | Kostur. |
| 3,078,516 | 2/1963 | Trammell et al. |

WILLIAM J. STEPHENSON, Primary Examiner

U.S. Cl. X.R.

26—54